United States Patent [19]
Yin

[11] Patent Number: 4,714,956
[45] Date of Patent: * Dec. 22, 1987

[54] COLOR DISPLAY APPARATUS AND METHOD THEREFOR

[76] Inventor: Ronald L. Yin, 2045 Sea Cliff Way, San Bruno, Calif. 94066

[*] Notice: The portion of the term of this patent subsequent to Dec. 31, 2002 has been disclaimed.

[21] Appl. No.: 806,673

[22] Filed: Dec. 9, 1985

Related U.S. Application Data

[63] Continuation-in-part of Ser. No. 422,741, Sep. 24, 1982, Pat. No. 4,562,461, which is a continuation-in-part of Ser. No. 309,820, Oct. 8, 1981, abandoned.

[51] Int. Cl.$^4$ .............................................. H04N 5/74
[52] U.S. Cl. ...................................... 358/60; 358/63; 358/231
[58] Field of Search ...................... 358/56, 59, 60, 61, 358/63, 63, 65, 230–232, 237, 211, 213; 313/495–497; 250/213 R, 213 VT

[56] References Cited

U.S. PATENT DOCUMENTS

| | | | |
|---|---|---|---|
| 2,349,298 | 5/1944 | Okolicsanyi | 178/7.3 |
| 2,605,335 | 7/1952 | Greenwood | 177/318 |
| 2,888,513 | 5/1959 | Melamed | 178/5.4 |
| 3,666,881 | 5/1972 | Stein | 178/5.4 BD |
| 3,760,096 | 9/1973 | Roth | 178/5.4 |
| 4,076,994 | 2/1978 | Anderson | 313/422 |
| 4,208,577 | 6/1980 | Wang | 250/213 |
| 4,562,461 | 12/1985 | Yin | 358/60 |

FOREIGN PATENT DOCUMENTS 134551 10/1979 Japan ........................... 250/213 VT

OTHER PUBLICATIONS

RCA Electro-Optics Handbook, 1974, p. 174.
Wm. V. Smith, Laser Applications, 1970, pp. 34–35, Artech House Inc., Dedham, Mass.
The Way Things Work, 1967, pp. 166–169, Simon & Schuster, New York.

*Primary Examiner*—Michael A. Masinick

[57] ABSTRACT

A method and an apparatus is disclosed for converting a plurality of electrical signals (14(a-c)) into a color visual display on a device (10). The device (10) comprises three CRT's (16(a-c)). Each CRT (16(a-c)) receives an electrical signal (14(a-c)), generates a beam of electrons (24(a-c)), modulates the beam of electrons (26(a-c)) and converts them into a beam of light (18(a-c)). The beams of light (18(a-c)) are focused and are delivered to impinge an optical mask (32) and to pass therethrough to impinge a photocathode screen (40) in an evacuated envelope (30). Within the envelope (30), spaced apart from the photocathode screen (40), is a segmented phosphor screen (42) with the phosphor screen (42) being defined by three different types of phosphor compositions in three different locations. Photoelectrons released from the photocathode (40) are accelerated and directed to impinge the phosphor screen (42).

21 Claims, 11 Drawing Figures

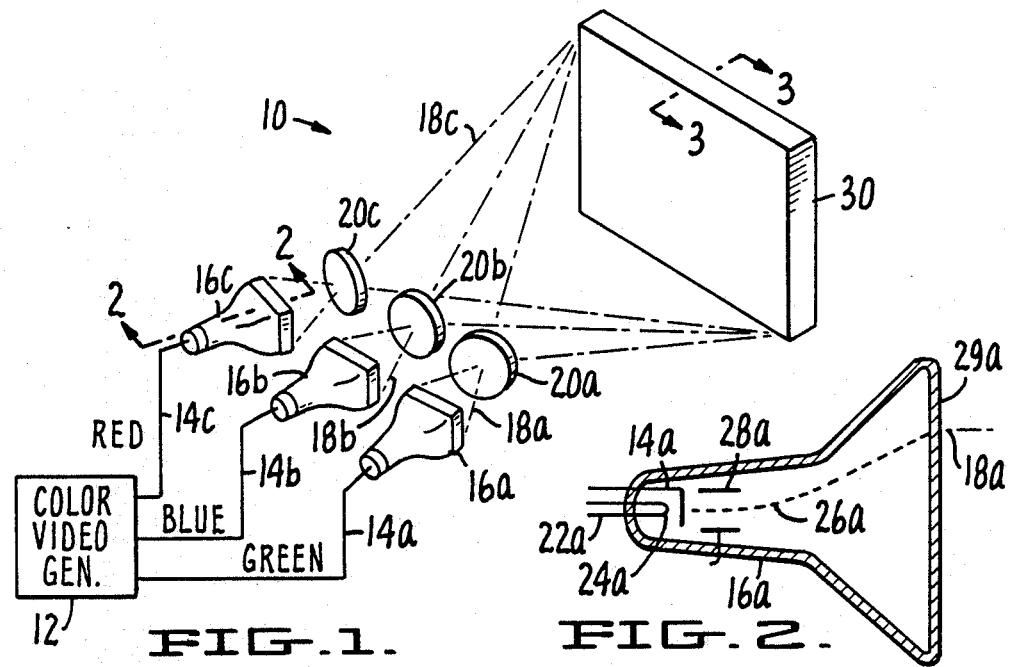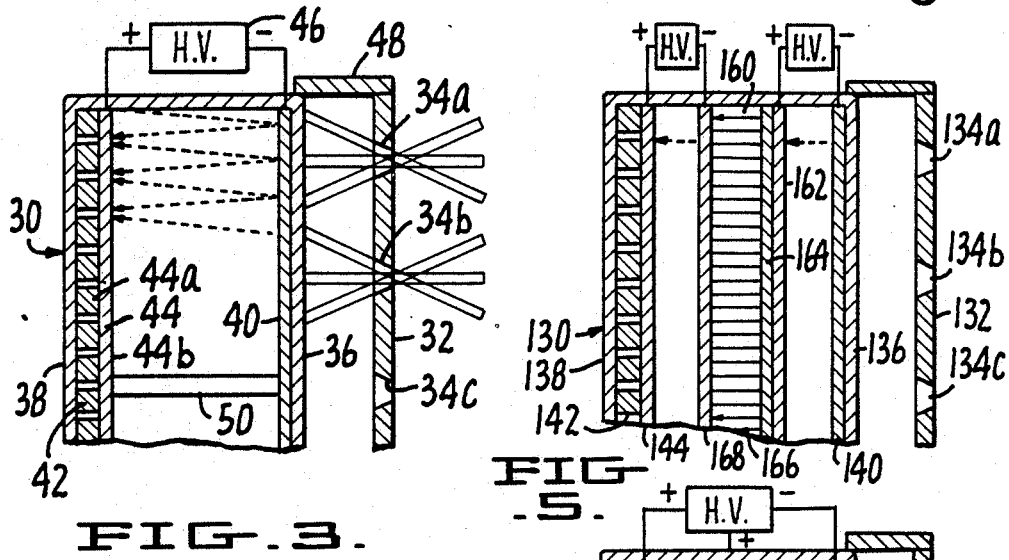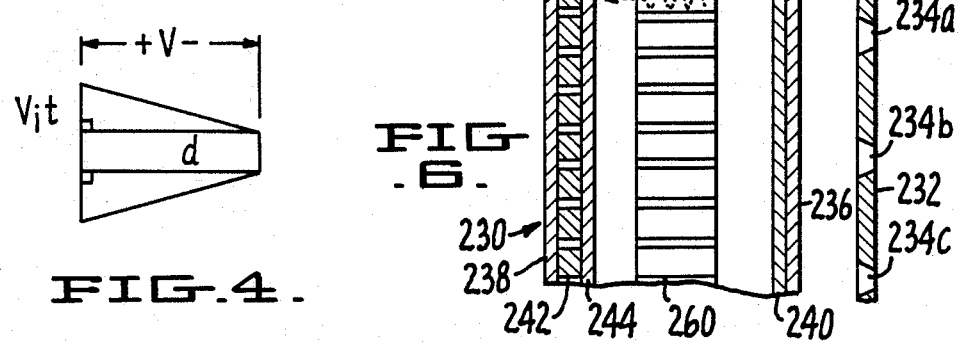

COLOR DISPLAY APPARATUS AND METHOD THEREFOR

This is a continuation-in-part application of a copending application Ser. No. 422,741, now U.S. Pat. No. 4,562,461 filed on Sept. 24, 1982, which is a continuation-in-part application of Ser. No. 309,820 filed Oct. 8, 1981, now abandoned.

TECHNICAL FIELD

The present invention relates to a color display apparatus and, more particularly, to a large area display apparatus for converting a plurality of video signals into a color visual display. The present application also relates to a method therefor.

BACKGROUND ART

Apparatuses for visually displaying an electrical video signal are well known in the art. A notable example is the cathode ray tube (CRT). The CRT is a raster scan device in which sequential electrical signals are received by the CRT and are displayed sequentially on a screen. The sequential displaying of the electrical signals is so fast, coupled with the persistance of the phosphor on the CRT, that an image which is suitable for viewing is created on the screen. Although the CRT has found wide acceptance in displaying television type electrical signals, its noteworthy shortcoming is that it cannot be made economically to provide a large viewing area. In particular, for large viewing area such as 100 cm×75 cm, the CRT must be so large and weigh so much in order to withstand the impact of an implosion, that the CRT cannot be employed in such application.

The principle upon which the CRT operates, i.e., cathodoluminescence, whereby electrons are emitted and are accelerated to a phosphor screen impinging thereon to create the visual display, is particularly well suited for visually displaying television type signals A cathodoluminescent display provides high resolution as well as brightness of the image on the screen. Thus, for large area screen viewing it is desirable to use the principle of cathodoluminescence.

U.S Pat. No. 4,076,994 discloses a type of display tube based on cathodoluminescence that is suitable for large screen application. The apparatus disclosed therein, however, requires an evacuated envelope containing a source to generate electrons and to direct them in paths and to guide them and to deflect them toward a phosphor screen. The structure required to direct, guide, and confine the electrons within an evacuated envelope appears to complicate the apparatus.

Another approach which has been used for large area viewing is by projecting the image on a large screen. However, such technique suffers from the disadvantages of a lack of sharpness in the image and of low intensity or low brightness of the image. In addition, in some cases, the brightness of the image is also dependent upon the angle of viewing.

Image tubes are well known in the art. An image tube is an electron device that reproduces on its fluorescent screen an image of the radiation pattern focused on its photosensitive surface. These tubes are used when it is desired to have an output image that is brighter than the input image or to convert non-visible radiation from an image into a visible display. Typically, however, most image tubes have diameter sizes of 18, 25 and 40 mm and do not have the capability of displaying a color image.

One type of an image tube is called the "proximity focus" tube, in which the photocathode and the phosphor screen are in parallel planes spaced closely together. In this type of apparatus an entire image is directed at a photocathode, releasing photoelectrons. The photoelectrons are directed at the phosphor screen; they are not focused but because of the high field between the phosphor screen and the photocathode, they do not deviate much from trajectories that are parallel to the tube's axis. However, the tube is small and the screen image erect, but the resolution is not as good as that for other types of image tubes employing focusing means. (See RCA Electro-Optics Hand Book, 1974 page 173-180.) U.S. Pat. No. 4,208,577 discloses a "proximity type" amplifier tube for amplifying an x-ray image.

An image tube employing a plurality of stages to magnify the image, using focusing means such as magnetic or electrostatic field, is also well known.

DISCLOSURE OF THE INVENTION

In the present invention, an apparatus for converting a plurality of electrical signals into a color visual display is disclosed. The apparatus comprises means for generating a plurality of beams of electrons. Means is also provided for modulating each beam of electrons by one of the plurality of electrical signals to produce a plurality of beams of modulated electrons. Each of the beams of modulated electrons is converted into a beam of modulated light, thereby producing a plurality of beams of modulated light. The plurality of beams of modulated light are directed to an evacuated envelope. The envelope comprises a photocathode screen having a plurality of different locations with each location adapted to release electrons in response to light impinging thereon. The envelope further comprises a phosphor screen, having a plurality of different phosphor compositions with each composition at a different location and each composition releasing visible light of a different color in response to electrons impinging thereon. The phosphor screen is positioned spaced apart from the photocathode screen. An optical mask optically masks each beam of modulated light such that each beam of modulated light impinges only one of the different locations on the photocathode screen. The electrons from the photocathode screen are accelerated to the phosphor screen. Finally, means is provided for moving the plurality of beams of modulated light to impinge the photocathode screen in different locations, whereby the movement of the plurality of beams of modulated light forms the color visual display on the phosphor screen.

The present application also relates to a method of converting a plurality of electrical signals into a color visual display.

BRIEF DESCRIPTION OF THE DRAWINGS

FIG. 1 is a perspective view of one embodiment of the apparatus of the present invention.

FIG. 2 is a cross-sectional view taken along the line 2—2 of the cathode ray tube, shown in FIG. 1, which is a portion of the apparatus of the present invention.

FIG. 3 is a cross-sectional view taken along the line 3—3 of the evacuated tube, which is a portion of the apparatus of the present invention.

FIG. 4 is a schematic side view showing the divergence of the photoelectrons from the photocathode screen to the phosphor screen.

FIGS. 5 and 6 are cross-sectional views of various embodiments of evacuated tube portion of the apparatus of the present invention.

DETAILED DESCRIPTION OF THE DRAWINGS

Figure 7:
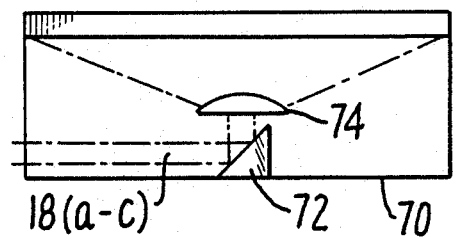
FIG. 7 is a top view of the optics portion of the present invention.

Referring to FIG. 1, there is shown an apparatus 10 of the present invention and a color video signal generator 12 for generating a plurality of electrical signals 14a, 14b and 14c. Each of the electrical signals represents a color component, such as green, blue and red, respectively. The three electrical signals, 14a-14c, are supplied to three cathode ray tubes 16a-16c, respectively, of the apparatus 10 of the present invention. Each of the CRT's 16a-16c generates a beam of electrons which is modulated by one of the plurality of electrical signals 14a-14c to produce a plurality of beams of modulated electrons. Each of the beams of modulated electrons is converted into a beam of modulated light 18(a-c), respectively. Each of the three beams of modulated light 18(a-c) is directed to a lens 20(a-c), which directs and focuses the beams of modulated light 18(a-c) to an evacuated envelope 30.

Referring to FIG. 2, there is shown in cross-sectional view the CRT 16a of the apparatus 10 of the present invention. Each of the CRT's 16 has a cathode 22a for generating a beam 24a of electrons. The beam 24a of electrons is modulated by the electrical signal 14a. The beam of modulated electrons 26a is directed to impinge a phosphor screen 29a to form a beam of modulated light 18a. The beam of modulated electrons 26a is deflected by a pair of deflecting plates 28a, causing the modulated beam 26a to scan across the phosphor screen 29a which, in turn, causes the modulated light 18a to be scanned.

The three beams of modulated light 18(a-c) are directed to impinge an optical mask 32, which has a plurality of holes 34(a-c, etc.). The mask 32 is located parallel to but spaced apart from the evacuated tube 30. The three beams of modulated light 18(a-c) impinge each hole 34 of the optical mask 32. All three beams 18(a-c) impinge each hole 34 at a different angle.

The evacuated envelope 30 comprises two substantially transparent, closely spaced, parallel walls: A first wall 36 and a second wall 38. A transmissive type photocathode screen 40 is immediately adjacent to and substantially co-extensive with the inner surface of the first wall 36 within the evacuated envelope 30. Each of the beams 18(a-c) is aligned to impinge the first wall 36, to pass therethrough and to impinge the photocathode screen 40. Since the phosphor screen 29a of each CRT 16a is a two-dimensional phosphor screen, the light generated on the phosphor screen 29a is focused and is directed by the lens 20a to a particular location on the surface of the photocathode screen 40. The movement of the modulated beam of electrons 26a causes the modulated beam of light 18a to move, thereby moving the beam 18a to a particular location on the surface of the photocathode screen 40.

From the photocathode screen 40, photoelectrons are emitted by the photocathode screen 40 in response to the electromagnetic radiation impinging thereon.

Spaced apart (typically on the order of 1.0 to 2.5 centimeters), but immediately adjacent to the first wall 36 is the second wall 38. A segmented phosphor screen 42 is immediately adjacent to and substantially co-extensive with the inner surface of the second wall 38. Immediately adjacent to and substantially co-extensive with the opposite side of the phosphor screen 42 is a thin aluminum screen 44. The photoelectrons released by the photocathode 40 are directed to impinge the aluminum screen 44, to pass therethrough and to impinge the phosphor screen 42 and to release visible electromagnetic radiation therefrom. The photoelectrons travel a trajectory generally defined by the line greatly exaggerated in FIG. 3.

The electrons released from the photocathode 40 are accelerated by a high voltage potential applied between the aluminum screen 44 and the photocathode 40 by a high voltage source 46. Typically, this is on the order of 25 to 50 KV. The aluminum screen 44 permits electrical contact to be made with the phosphor screen 42 by the high voltage source 46. In addition, the one-side 44a of the aluminum screen 44, the side immediately adjacent to the phosphor screen 42, reflects any backscattered visible radiation from the phosphor screen 42 through the second wall 38. The other side 44b of the aluminum screen 44, the side facing the photocathode 40, is darkened to reduce the reflection of any light from the beams 18(a-c) that are passed through the photocathode 40.

The photoelectrons from the photocathode 40 are accelerated towards the phosphor screen 42 and, upon impingement with the phosphor screen 42, the electrons convert the energy into visible radiation. Because the phosphor screen 42 is substantially parallel to the photocathode 40 and is substantially the same size, there is a one-to-one correspondence between locations on the photocathode 40 to locations on the phosphor screen 42. By moving each of the beams 18(a-c) across the surface of the photocathode 40, different corresponding locations of the phosphor screen 42 are excited. An image is thus formed on the phosphor screen 42. A viewer would see the image displayed on the apparatus 10 in front of the second wall 38.

Since all three beams 18(a-c) pass through each hole 34 of the optical mask 32, but with each beam 18 impinging a different location on the photocathode 40, the electrons emitted at each location of the photocathode 40 are accelerated and impinge the phosphor screen 42 at a different location. Each of the segments or different locations on the phosphor screen 42 is of a different phosphor composition, such that electrons impinging thereon would cause the colors of red, blue and green to be released. The beams of modulated light 18(a-c) are aligned such that each beam 18 impinges only those locations on the photocathode 40 that would release photoelectrons and impinge the phosphor screen 42 and would excite only one single phosphorous composition. The modulation of the intensity or frequency of the one beam of light thus modulates one color on the phosphor screen 42.

The optical mask 32 can be held by bracket 48 spaced apart from the evacuated enveloped 30. Alternatively, the optical mask 34 can be placed within the evacuated envelope 30, spaced apart from the photocathode 40.

Because the evacuated envelope 30 is of a large area, for example, 100 cm.×75 cm., internal support walls 50 are needed to support the evacuated envelope 30 to prevent an implosion of the envelope 30 due to atmospheric pressure. These walls 50 are a plurality of space, substantially parallel, support walls that extend perpendicularly between the first wall 36 and the second wall 38.

In the operation of the apparatus 10 of the present invention, the video signal generator 12 generates a plurality of electrical signals 14(a–c). The color video signal generator 12 can be, form example, from a TV receiver. Other sources for color video signal includes video tape recorder or the output of a computer. The electrical signal from the TV receiver 12 is typically of sequential electrical signals in a plurality of lines which define a field of an image. In the United States, each image comprises two 525 lines forming a frame which is comprised of two interleaving fields. A field is formed every 1/60 of a second. These standards are well known in the television industry.

Each of the electrical signals 14 from the color video signal generator 12 is representative of a color component of the color video signal. The signal 14 is supplied to a CRT 16. the CRT 16 generates a beam 21 of electrons whose amplitude is modulated by the video electrical signal 14 to produce a beam of modulated electrons 26. The modulated beam of electrons 26 is directed to impinge a phosphor screen 29 in the CRT 16 and to convert the electrons into a modulated beam of light 18. The light 18 can be of any frequency. However, preferably, the light 18 is in the visible range from approximately 400 nm to approximately 700 nm.

The CRT 16 must deflect the beam of electrons 26 across phosphor screen 29 in a horizontal direction at substantially the same rate as the rate of the line received from the color video signal generator 12. The CRT 16 must also deflect the beam of modulated electrons 26 across its phosphor screen 29 in a vertical direction at substantially the same rate as the rate of the field, which is defined by the signal from the color video signal generator. Thus, the CRT 16 converts each electrical signal from the color video signal generator 12 into a two-dimensional visual image. The visual image is of a single color component of that video signal generator 12. The modulated beam of light 18 is directed and is focused by a focussing lens 20 to impinge the evacuated envelope 30. At each particular location on the photocathode screen 40 where the light 18 impinges thereon, photoelectrons released by the photocathode 40 are accelerated by the high voltage 46 and pass through the aluminum screen 44 to impinge the phosphor screen 42. The image that is displayed at the phosphor screen 42 is comprised of a plurality of pixels, with each pixel on the phosphor screen 42 of a different phosphor composition and having a corresponding pixel on the photocathode 40.

In general, because the photoelectrons from the photocathode 40 within the evacuated envelope 30 are not focused as they are directed towards the phosphor screen 42, there is a slight divergence of the beam, as shown greatly exaggerated in FIG. 4, as the photoelectrons travel the distance between the photocathode screen 40 and the phosphor screen 42. The amount of divergence can be approximately calculated as follows:

The maximum divergence occurs when the photoelectrons are released with a velocity $V_i$ perpendicular to the direction from the photocathode 40 to the phosphor screen 42.

The maximum amount of time for the photoelectrons to traverse the distance from the photocathode 40 to the phosphor screen 42 is:

$$\tfrac{1}{2}at^2 - d = 0$$

where:
  $a = ev/md$
and:
  a—acceleration of electron
  e—charge of electron
  v—applied high voltage
  d—distance between phosphor screen 38 and photocathode screen 36
  m—mass of electron
  t—time for electron to travel the distance d
Solving for t and substituting for a $$t = d\sqrt{\frac{2m}{ev}}$$

The amount of divergence is $$\frac{V_i t}{d} = V_i \sqrt{\frac{2m}{ev}}$$

A further approximation can be made based upon $$\tfrac{1}{2}mV_i^2 = (h\nu - \phi) \text{ or } mV_i^2 =$$

$$2(h\nu - \phi) \simeq 1 \text{ electron-volt then: } \frac{V_i t}{d} = \sqrt{\frac{2}{ev}}$$

The advantage of having an optical mask 32 spaced apart from the outer surface of the first wall 36 is that the beams of modulated light 18(a–c) do not have to be precisely focused at the photocathode 40. Each hole 34 of the optical mask 32 limits the size of the beam that passes through the hole and impinges the photocathode 40. Thus, the optical mask 32 permits tolerances in the focusing lens 20a, and further eliminates the cross-talk or the overlap of a portion of one pixel with its immediate, adjacent pixel of a different color.

Referring to FIG. 5, there is shown another embodiment of the evacuated envelope 130. The evacuated envelope 130 comprises an optical mask 132, a first wall 136, a second wall 138, a segmented phosphor screen 142, an aluminum screen 144, and a photocathode screen 140, all as previously described. The phosphor screen 142 has deposited thereon three phosphorous compositions which emit the colors or red, blue and green in response to electrons impinging thereon. The optical mask 132 has a plurality of holes 134a, 134b, etc. and is located parallel to but spaced apart from the outer surface of the one wall 136.

The evacuated envelope 130 also comprises an electron amplifier section 160 disposed between the photocathode 140 and the aluminum screen 144. The electron amplifier 160 comprises a second aluminum screen 162, a second phosphor screen 164, a fiber optic plate 166, and a second photocathode screen 168. The second aluminum screen 162 is positioned adjacent and parallel to, but spaced apart from the first photocathode screen 140. Immediately adjacent to and substantially co-extensive with the side of the second aluminum screen 162, facing away from the photocathode 140, is the second phosphor screen 164. The fiber optic plate 166 is immediately adjacent to and substantially co-extensive with the side of the second phosphor screen 164 opposite the second aluminum screen 162. Finally, the second photocathode screen 168 is immediately adjacent to and substantially co-extensive with the side of the fiber optic plate 166 opposite the second phosphor screen 164. The second photocathode screen 168 is immediately adjacent to, but spaced apart from the first aluminum screen 144.

In the operation of the evacuated envelope 130, electrons are released from the photocathode screen 140 by the action of light impinging thereon. The electrons are accelerated and are directed to impinge the second aluminum screen 162, to pass therethrough and to impinge the second phosphor screen 164. When the electrons from the photocathode 140 impinge the second phosphor screen 164, light is emitted. The emitted light is transmitted by the fiber optic 166 and impinges the second photocathode 168. Electrons released from the second photocathode screen 168 are accelerated and aligned to impinge the aluminum screen 144 to pass therethrough and to impinge the first phosphor screen 142. The impingement of the electrons from the second photocathode screen 168 on the phosphor screen 142 produces the desired display for viewing.

The advantage of the evacuated envelope 130 is that with the electron multiplier section 160, the beams of modulated light 18(a-c) can be of low intensity. If a small CRT 16 is used, with the same illumination output, the illumination per unit area impinging on the evacuated envelope 130 would be correspondingly lower. Thus, if a smaller CRT 16a is used, it may be desirable to use the evacuated envelope 130 with the electron multiplier section 160.

Referring to FIG. 6, there is shown yet another evacuated envelope 230, used in the apparatus of the present invention. The evacuated envelope 230 comprises a first wall 236, a second wall 238, a segmented phosphor screen 242, an aluminum screen 244, a photocathode 240, and an optical mask 232, all as previously described. Between the photocathode screen 240 and the aluminum screen 244 is an electron multiplier 260. The electron multiplier 260 is of the type commonly designated as a microchannel plate. The microchannel plate is a dynode. A voltage potential is applied between the microchannel plate 60 and the photocathode screen 240 and between the aluminum screen 244 and the microchannel plate 260.

The function of the microchannel plate 260 is to increase the number of electrons entered into the microchannel plate 260 from the photocathode 240. The multiplied electrons from the microchannel plate 260 are then accelerated and directed to impinge the phosphor screen 242.

Similar to the evacuated envelope 130, the evacuated envelope 230 has the advantage that modulated beams of light 18(a-c) of low illumination can be used.

Referring to FIG. 7, there is shown the apparatus 10 of the present invention encased in a relatively narrow enclosure 70. The beams 18(a-c) of modulated light are directed at a 45-degree prism 72. The beams reflected therefrom are passed through a refractive lens 74 which is then incident upon the evacuated tube 30 on the one wall 36 thereof, after passing through the optical mask 32. The beams 18(a-c) are reflected from the prism 72 at substantially 90 degrees to the incident beams on the prism 72. For wide refraction of the beams 18(a-c) from the refractive lens 74, thereby enabling the apparatus 10 to be encased in a narrow enclosure 70, the lens 74 can be of a type known as "fish eye" lens. If the incident beams 18(a-c) are monochromatic, the fish-eye lens 74 can be made economically as it needs to refract only that frequency of light.

Figure 8:
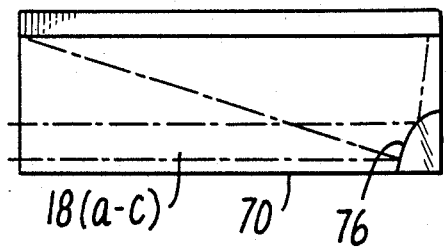
FIG. 8 is a top view of another embodiment of the optics portion of the apparatus of the present invention.

Referring to FIG. 8, there is shown yet another variation of the optical element that is used to encase the apparatus 10 within a narrow enclosure 70. The beams 18(a-c) are incident upon a concave-shaped reflector 76. The concave-shaped reflector 76 reflects the beams therefrom and direct the reflected beams onto the one wall 36 of the evacuated envelope 30 after passing through the optical mask 32. The concave-shaped reflector 76 can be near one corner of the enclosure 70 and thus the beams 18(a-c) incident thereon would be reflected thereon at substantially 90 degrees.

Figure 9:
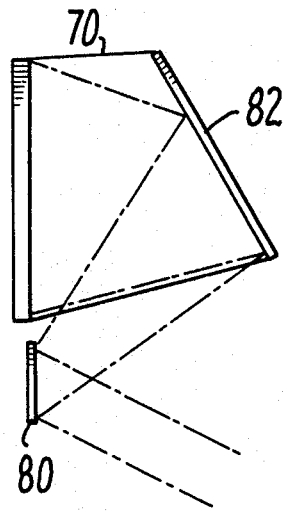
FIG. 9 is a side view of still yet another embodiment of the optics portion of the apparatus of the present invention.

Referring to FIG. 9, there is shown yet another optical element which confines the apparatus 10 within a narrow enclosure 70. The beams 18 (a-c) impinge a first mirror surface 80 and reflect therefrom onto a second mirror surface 82 and reflect therefrom to impinge the one wall 36 of the evacuated envelope 30, after passing through the optical mask 32. The second mirror 82 directs the beams 18(a-c) substantially from the bottom of the enclosure 70 and reflect them onto the one wall 36 of the evacuated envelope 30.

In general, the shape of the evacuated envelope 30 is not significant. The evacuated envelope 30 can comprise two spaced parallel walls, or the envelope can comprise two spaced curved walls. The only requirement is that the photocathode screen and phosphor screen are substantially equal distance from one another, or that they are spaced apart at a constant distance. The display 10 could then be a curved screen. The size of the evacuated envelope 30 can vary. If the size of the envelope 30 is small (e.g., 30 cm×40 cm. or less) than internal support walls 50 are not needed. The material that is used to manufacture the envelope 30 can be glass or any other material having high mechanical strength to withstand the atmospheric pressure. The photocathode screen 40 is chosen to maximize the amount of electrons released therefrom in response to the particular frequency of the light impinging thereon. Thus, the spectral response of the photocathode is depended upon the particular frequency of the light incident thereon. Finally the phosphor screen is made from well-known material and can produce visible light in response to the photoelectrons impinging thereon. The high voltage source 46 is also of well-known design.

Figure 10:
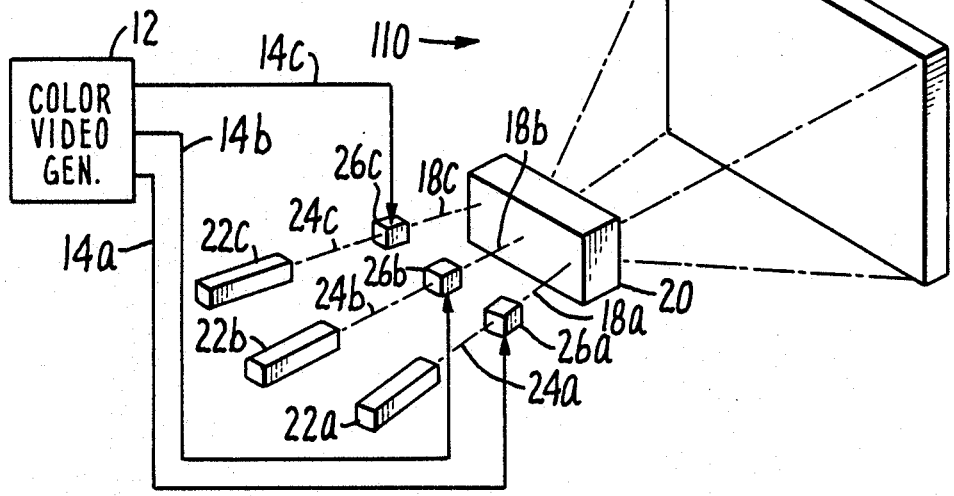
FIG. 10 is a perspective view of another embodiment of an apparatus for displaying a color display.

Referring to FIG. 10, there is shown another embodiment for an apparatus 110. The apparatus 110 receives the three electrical signals designated as 14(a-c), respectively, from a color video signal generator 12. As previously described, the three electrical signals represent the three components of the color visual display. Three lasers 22 (a-c) are provided. Each laser 22 generates a beam of coherent electromagnetic radiation 24. Each beam 24 is directed to impinge a modulator 26. The electrical signal 14 is used to modulate the modulator 26, causing a modulated beam of coherent electromagnetic radiation 18a to be generated therefrom. The three beams of modulated light 18(a-c) are directed to a scanner 20. From the scanner 20, the beams of modulated light are directed at the evacuated envelope 30.

The beams 24(a–c) of laser light can be of any frequency. For example, beams 24(a–c) can be in the visible range; i.e., from approximately 400 nm. to approximately 700 nm. The electro-optic modulator 26(a–c) can also be of any type, so long as the electrical signals 14(a–c) can be used to modulate the amplitude of the particular frequency of the light beam 24 that is used. In addition, the electro-optic modulator 24 can also be a frequency modulator, changing the frequency of the light beam 24. Since the photocathode screen 40 is frequency sensitive, modulating the frequency of the light impinging thereon also modulates the photoelectron beam current released therefrom. If a laser beam is used, the focusing lens might not be necessary because the beam has spatial coherence.

Figure 11:
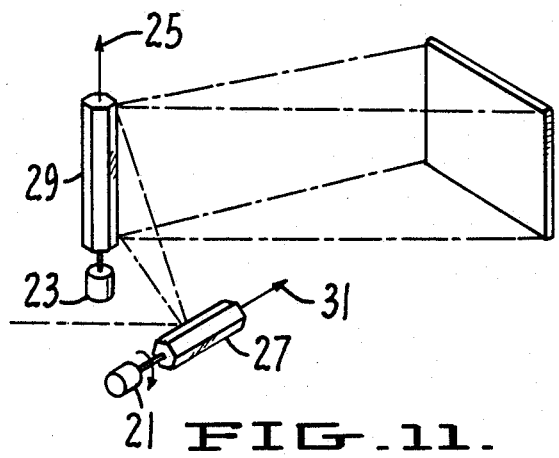
FIG. 11 is a perspective view of a scanning system, which is suitable for use in the apparatus shown in FIG. 10.

Referring to FIG. 11, there is shown a deflector 20. The deflector 20 comprises two mirrors—a first mirror 27 and a second mirror 29. Each mirror is rotated by a motor: a first motor 21 rotates the first mirror 27, while a second motor 23 rotates a second mirror 29. The axis of rotation 31 of the first mirror 27 is orthogonal or perpendicular to the axis of rotation 25 of the second mirror 29. The beams 18(a–c) are aligned to impinge the first rotating mirror 27, to reflect therefrom, to impinge the second mirror 29, resulting in the beams 18(a–c) being scanned in two dimensions—a horizontal dimension and a vertical dimension. As before, the rate at which the beams 18(a–c) is scanned across the horizontal direction and the vertical direction of the evacuated envelope 30 is determined by the number of mirror surfaces of the first mirror 27 and of the second mirror 29 and of their respective rates of rotation. Such scanning system is well-known in the art. In addition, of course, other types of deflectors, such as electro-optical deflectors, can also be used.

It should be appreciated that with the method and the apparatus of the present invention, a large area screen which is suited for the visual color display of electrical signals and, in particular, of video electrical signals, such as from television receivers is made. Unlike the projection-type system, the present invention offers brightness of image and higher resolution. Unlike the guided beam concept, the present invention offers simplicity in design and in manufacturing thereof. In the method and apparatus of the present invention, the video signals are modulated and delivered onto a two-dimensional screen by optical means. With optical modulation and delivery, this portion of the apparatus does not have to be in an evacuated envelope, thereby simplifying the construction of the apparatus. The only portion of the apparatus which must be within an evacuated envelope is the photocathode screen and the phosphor screen, which serves to amplify the modulated signal. Unlike the direct projection of a beam of light onto a screen, the present invention does not require a huge power output device. Moreover, the frequency of the modulated beam of light can be visible or invisible. The photocathode screen, responsive to the frequency of the impinging beams of light, converts them into electron beams which are then converted into a color visual display by the phosphor screen.

I claim:

1. A method of converting a plurality of electrical signals into a color visual display, said method comprising the steps of:
   generating a plurality of beams of electrons;
   modulating each beam of electrons by one of said plurality of electrical signals to produce a plurality of beams of modulated electrons;
   converting each beam of modulated electrons into a beam of modulated light to produce a plurality of beams of modulated light;
   directing said plurality of beams of modulated light at a two-dimensional photocathode screen in an evacuated envelope;
   optically masking each beam of modulated light such that each beam of modulated light impinges a different location on said photocathode screen, said screen having a plurality of different locations;
   releasing electrons from said photocathode screen in response to said plurality of beams of modulated light impinging thereon;
   accelerating said electrons to a two-dimensional phosphor screen in said envelope, said phosphor screen having a plurality of different phosphor compositions, in a plurality of different locations, each phosphor composition in a different location releasing visible light of a different color in response to electrons impinging thereon;
   releasing visible light from said phosphor screen in response to electrons impinging thereon; and
   moving said plurality of beams of modulated light to impinge said photocathode screen in different locations whereby the movement of said plurality of beams of modulated light forms said color visual display.

2. The method of claim 1 further comprising the step of
   impinging electrons from each of said different locations from said photocathode screen at a different phosphor composition.

3. The method of claim 1 further comprising the step of
   multiplying electrons from each of said different locations from said photocathode screen; and
   impinging said multiplied electrons at a different phosphor composition.

4. The method of claim 3 wherein said multiplying step further comprises the steps of:
   accelerating said electrons to impinge a second phosphor screen;
   converting said electrons into electromagnetic radiation by said second phosphor screen;
   converting said electromagnetic radiation from said second phosphor screen into said multiplied electrons by a second photocathode screen; and
   accelerating said multiplied electrons.

5. The method of claim 3, wherein said multiplying step further comprises the steps of:
   impinging said electrons from said photocathode screen at a dynode;
   releasing said multiplied electrons from said dynode; and
   accelerating said multiplied electrons.

6. The method of claim 1 wherein said moving step is:
   scanning each of said beams of electrons.

7. The method of claim 1 further comprising focusing each of beams of modulated light on
   said photocathode screen.

8. An apparatus for converting a plurality of electrical signals into a color visual display, said apparatus comprising:
   means for generating a plurality of beams of electrons;

means for modulating each beam of electrons by one of said plurality of electrical signals to produce a plurality of beams of modulated electrons;

means for converting each beam of modulated electrons into a beam of modulated light, to produce a plurality of beams of modulated light;

an evacuated envelope comprising:
- a photocathode screen having a plurality of different locations, each location for releasing electrons in response to light impinging thereon;
- a phosphor screen, having a plurality of different phosphor compositions, each composition at a different location, each location for releasing visible light of a different color, in response to electrons impinging thereon, said screen positioned spaced apart from said photocathode screen;
- an optical mask for optically masking each beam of modulated light such that each beam of modulated light impinges only one of said different locations on said photocathode screen;
- means for accelerating the electrons from said photocathode screen to said phosphor screen; and
- means for moving said plurality of beams of modulated light to impinge said photocathode screen in different locations;

whereby the movement of said plurality of beams of modulated light forms said color visual display.

9. The apparatus of claim 8 wherein each phosphor composition of said phosphor screen releases light in response to the electrons from one of the different locations of said photocathode screen impinging thereon.

10. The apparatus of claim 8 further comprising:
- means for multiplying said electrons from said photocathode screen; and
- said phosphor screen releases light in response to said multiplied electrons impinging thereon.

11. The apparatus of claim 10, wherein said multiplying means further comprising:
- a second phosphor screen, in said envelope, for emitting electromagnetic radiation in response to said electrons from said photocathode screen impinging thereon;
- a second photocathode screen, in said envelope, for emitting said multiplied electrons in response to said radiation from said second phosphor screen impinging thereon; and
- means for accelerating said electrons from said photocathode screen to impinge said second phosphor screen.

12. The apparatus of claim 11, wherein said second phosphor screen an said second photocathode screen are substantially coextensive and adjacent to one another.

13. The apparatus of claim 12, wherein said multiplying means further comprising:
- dynode means in said envelope for emitting said multiplied electrons in response to said electrons from said photocathode screen impinging thereon.

14. The apparatus of claim 13, wherein said dynode means is a microchannel plate electron multiplier.

15. The apparatus of claim 8, wherein said envelope further comprises:
- two spaced, substantially parallel walls; each wall of a substantially transparent material;
- said photocathode screen adjacent to and substantially coextensive with the inner surface of a first wall; and
- said phosphor screen adjacent to and substantially coextensive with the inner surface of a second wall.

16. The apparatus of claim 15 wherein said beams of modulated light are aligned to impinge said first wall of said envelope, to pass therethrough and to impinge one side of said photocathode screen and to release electrons on the opposite side of said photocathode screen.

17. The apparatus of claim 16, wherein said envelope further comprises:
- a plurality of spaced, substantially parallel support walls extending substantially perpendicularly between said first and said second walls.

18. The apparatus of claim 17, wherein each of said generating means, modulating means, converting means and moving means together forms a cathode-ray-tube.

19. The apparatus of claim 18 for converting three electrical signals into a color visual display.

20. The apparatus of claim 8 further comprising means for focussing each of said beams of modulated light on said photocathode screen.

21. An apparatus for converting an electrical signal into a color visual display, said signal having a first component representative of a first color component of said display, a second component representative of a second color component of said display, and a third component representative of a third color component of said display, said apparatus comprising:
- means for generating a first beam of electrons;
- means for modulating said first beam of electrons by said first component of said electrical signal;
- means for converting said first beam of electrons into a first beam of light;
- means for generating a second beam of electrons;
- means for modulating said second beam of electrons by said second component of said electrical signal;
- means for converting said second beam of electrons into a second beam of light; means for generating a third beam of electrons;
- means for modulating said third beam of electrons by said third component of said electrical signal;
- means for converting said third beam of electrons into a third beam of light; an evacuated envelope comprising:
  - a transmissive photocathode screen on one side of said screen for releasing electrons in response to light impinging on the opposite side thereof;
  - a phosphor screen having three different types of phosphor compositions, each type of compositions at a plurality of different locations different from the other types and for releasing light of a different color, in response to electrons impinging thereon, said phosphor screen positioned adjacent to and spaced apart from said photocathode screen; means for focussing said first, second and
- third beams of light onto said opposite side of said photocathode screen;
- an optical mask positioned spaced apart from said photocathode screen for optically masking said first, second and third beams of light such that each beam of light impinges a different location on the photocathode screen; each of said different location in substantial registry with the location of one of said three types of phosphor composition;
- means for accelerating the electrons from said photocathode screen to said phosphor screen; and
- means for moving said first, second and third beams of electrons, causing the movement of said first, second and third beams of light, to impinge said photocathode screen in different locations;
- whereby the movement of said first, second and third beams of light forms said color visual display.

* * * * *